United States Patent

Hell et al.

[15] 3,688,033

[45] Aug. 29, 1972

[54] METHOD OF COMPOSING HALF-TONE PICTURES BY MEANS OF ELECTRONIC PHOTOTYPE SETTERS

[72] Inventors: Rudolf Hell; Klaus Wellendorf, both of Kiel; Roman Koll, Kiel-Wellingdorf; Eckhard Lindemann, Raisdorf, all of Germany

[73] Assignee: Kommanditgesellschaft Dr.-Ing Rudolf Hell, Kiel, Germany

[22] Filed: Nov. 25, 1970

[21] Appl. No.: 92,615

Related U.S. Application Data

[63] Continuation-in-part of Ser. No. 750,531, Aug. 6, 1968, abandoned.

[30] Foreign Application Priority Data

Aug. 26, 1967 Germany..........P 15 97 773.8

[52] U.S. Cl.....................................................178/15

[51] Int. Cl...............................................H04l 15/00

[58] Field of Search....178/15, 6.7, 6.6 B; 340/324 A

[56] References Cited

UNITED STATES PATENTS

| | | | |
|---|---|---|---|
| 3,480,943 | 11/1969 | Manber | 340/324 A |
| 3,436,472 | 4/1969 | Kyte | 178/6.7 |
| 3,463,880 | 8/1969 | Corson | 178/7.2 |

*Primary Examiner*—William C. Cooper
*Assistant Examiner*—Horst F. Brauner
*Attorney*—Hill, Sherman, Meroni, Gross & Simpson

[57] ABSTRACT

Method and apparatus for composing continuous tone pictures by means of electronic phototype setters wherein characters to be reproduced are manually or photographically produced and scanned electro-optically and then stored in binary coded form into a memory. The characters are read from the memory based on a program and continuous tone pictures are composed for relief printing and offset printing by using a finite number of raster fields of different forms and which may be combined to produce a desired image for printing.

10 Claims, 14 Drawing Figures

INVENTORS
RUDOLF HELL
KLAUS WELLENDORF
ROMAN KOLL
ECKHARD LINDEMANN

BY Hill, Sherman, Meroni, Gross & Simpson ATTORNEYS

INVENTORS
RUDOLF HELL, KLAUS WELLENDORF,
ROMAN KOLL & ECKHARD LINDEMANN

BY Hill, Sherman, Meroni, Gross & Simpson ATTORNEYS

INVENTORS
RUDOLF HELL, KLAUS WELLENDORF,
ROMAN KOLL & ECKHARD LINDEMANN

BY Hill, Sherman, Meroni, Gross & Simpson
ATTORNEYS

INVENTORS
RUDOLF HELL
KLAUS WELLENDORF
ROMAN KOLL
ECKHARD LINDEMANN

BY Hill, Sherman, Meroni, Gross & Simpson
ATTORNEYS

INVENTORS
RUDOLF HELL
KLAUS WELLENDORF
ROMAN KOLL
ECKHARD LINDEMANN

BY Hill, Sherman, Meroni, Gross & Simpson
ATTORNEYS

INVENTORS
RUDOLF HELL
KLAUS WELLENDORF
ROMAN KOLL
ECKHARD LINDEMANN

BY Hill, Sherman, Meroni, Gross & Simpson
ATTORNEYS

INVENTORS
RUDOLF HELL, KLAUS WELLENDORF,
ROMAN KOLL & ECKHARD LINDEMANN
BY Hill, Sherman, Meroni, Gross & Simpson ATTORNEYS

INVENTORS

RUDOLF HELL, KLAUS WELLENDORF,
ROMAN KOLL & ECKHARD LINDEMANN

BY Hill, Sherman, Meroni, Gross & Simpson ATTORNEYS

METHOD OF COMPOSING HALF-TONE PICTURES BY MEANS OF ELECTRONIC PHOTOTYPE SETTERS

CROSS-REFERENCE TO RELATED APPLICATIONS

This application is a Continuation-in-Part of application, Ser. No. 750,531 filed Aug. 6, 1968, now abandoned, entitled Method Of Composing Rastered Continuous Tone Pictures by Rudolf Hell, Klaus Wellendorf, Roman Koll and Eckhard Lindemann.

BACKGROUND OF THE INVENTION

1. Field of the Invention

This invention relates in general to printing and in particular to phototype setters which allow rapid and accurate setting of type by photographic methods.

2. Description of the Prior Art

For many years type for printing was set by hand. Later linotype machines which automatically allowed the setting of type based on the operation of a keyboard were utilized. Recently photographic processes have come into use wherein characters are formed on the luminous screens of cathode ray tubes and the characters are then photographically reproduced for printing purposes.

SUMMARY OF THE INVENTION

The present invention relates to a method of composing rastered continuous tone pictures by means of electronic phototype setters that operate by rastering.

In this specification an electric phototype setter operating by rastering means apparatus in which luminous images of the characters, figures or other patterns to be composed are produced on the picture screen of a cathode ray tube by an electron beam which passes dot for dot and column for column over the picture screen and which is gated or blocked to correspond to the picture to be recorded. The luminous images are focused by an optical system onto photopaper or film which is then developed and used in an offset printing process or other type of printing.

The present invention stores characters necessary for the phototype setting in binary coded form which are then read from a memory in accordance with the actual setting program which may also be in binary form and might for example be stored on a punched tape. To compose rastered continuous tone pictures with phototype setters, each individual raster point must be recorded like a picture pattern and if necessary each point may be composed of still smaller picture elements. Thus, the picture content of raster dots of different size and, if necessary, of different forms must be stored to form a type of raster dot alphabet. The various forms of raster dots may then be recalled by the memory to compose a composite picture as desired.

The picture composing program is obtained by photoelectrically scanning an original unrastered picture and then converting the brightness values of the picture at different points into binary coded data.

It is inherent that continuous tone pictures be composed in rastered forms by means of a phototype setter that operates on a raster dot for raster dot basis.

Raster dots of very small size may be obtained with a cathode ray beam as it is possible to focus the beam very sharply for this purpose.

Thus, the present invention provides for the storage of raster dots of varying sizes and shades of grey which may be utilized to form pictures having varying compositions.

In the present invention characters may be manually produced and/or placed before an electro-optically scanning means which records the characters as electronic data. The electronic data is stored in a memory of a phototype setting machine and a program allows the call-out of the particular character by utilizing its address to allow the production of half-tone dot pictures since the characters may be produced by hand or accurate patterns may be obtained and these scanned photo-optically.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
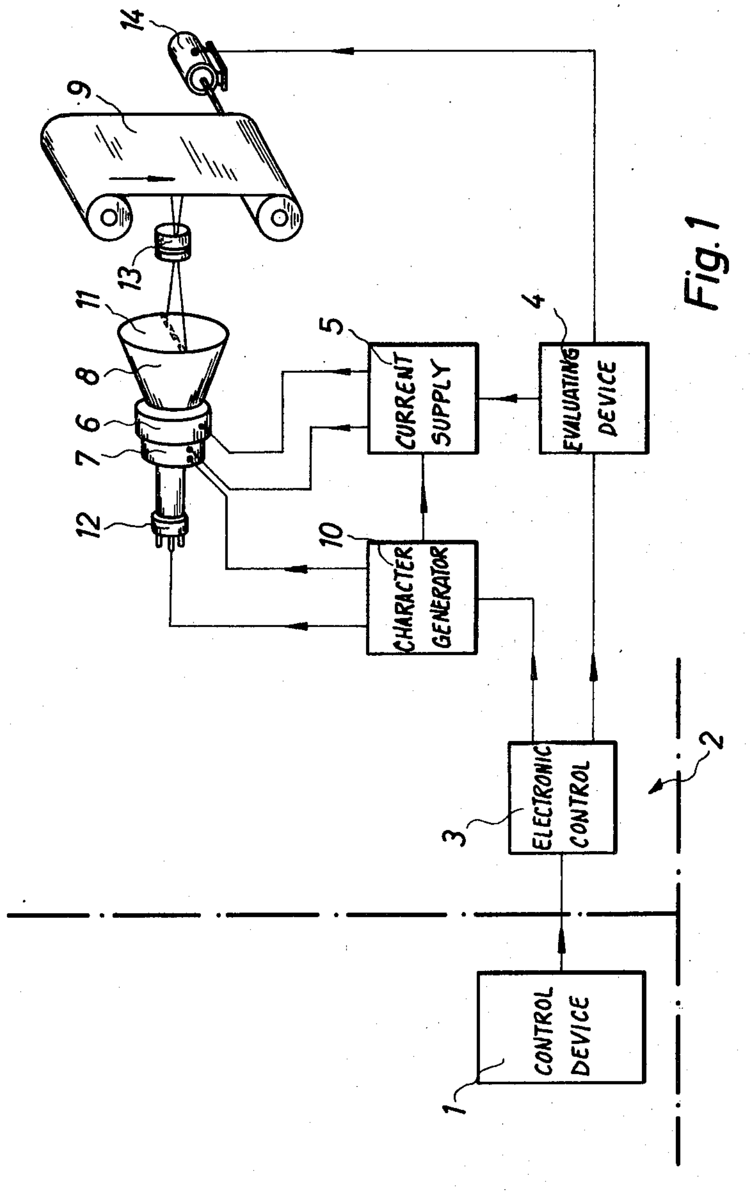
FIG. 1 is a diagrammatic view of the printing method of this invention.

The invention relates to a method of composing half-tone pictures by means of electronic phototype setters operating by rastering.

High speed electronic phototype setters, as have been made known in the last few years, produce luminous pictures on the picture screen of a cathode ray tube, which may be used as matrices of the characters to be composed. These luminous matrices which are produced at very high speed, are projected with the aid of an optical system onto photomaterial, paper or film, are subsequently developed and processed further by printing.

The expression "character" includes, apart from letters and numbers, also picture patterns composed of black and white elements. Thus exotic characters are also included, such as for example Chinese or Japanese characters, furthermore, firms' styles and finally black-white patterns of any content.

The size of the characters in the electronic setters is adapted to the densities of script which usually occur in the case of composing tasks and reaches from 4 to 24 typographical dots (one typographical dot = 0.376 mm). However, in the composing practice, it is often desired to compose smaller or larger characters. By altering the deflection of the cathode ray in horizontal and vertical direction and by correspondingly controlling the brightness and the size of the cathode ray dot, larger or smaller characters or black-white patterns may to a wide extent be represented. It is in this case interesting that very small patterns can be composed, for this gives the possibility of composing half-tone pictures, which are pictures with varying grey tones, with the aid of the electronic phototype setter.

Printing can only be effected in black or white and color may be added to the paper or not. Therefore, as is known, half-tone pictures are printed by rastering. The picture to be printed is divided by a square grid into a large number of small fields which contain more or less large black spots while the remainder of the field remains unblackened. The ratio of the spot with respect to the surface of the raster field is the grey value. An accumulation of the raster fields with large black printed spots appears to the observer's eye as a dark part of the picture, an accumulation of raster fields with small spots or dots looks like a bright or white picture part. The rastering of a picture is given in mesh number per centimeter. It amounts to about 30 in the case of rough rasters as are used for printed pictures in newspapers, to about 40 in book printing and in the case of high value pictures 50 and even more. In the case of newspaper composition, a raster field is therefore equal to a square with side length of 0.33 mm., in the case of book printing and quality printing, the dimensions are accordingly 0.25 mm. and 0.2 mm.

It is known for other purposes, e.g. for transmitting half-tone pictures over news transmitting channels, to compose half-tone pictures from a limited number of grey values between white and black. If the number of grey stages to be used for recording a picture is limited to a number which is sufficient for avoiding a visible zone formation between adjacent picture parts with approximately equal brightness values, a raster alphabet can be formed in which the individual characters have a value increasing from the smallest to the largest black component. The increase in these values should, and this is an essential point of the inventive idea, follow a determined, non-linear function. With the aid of the phototype setter, the characters with different covering values of this raster alphabet are arranged adjacent one another in lines according to a picture composing program and the lines are arranged one below the other and thus form pictures.

The picture composing program is obtained with the aid of a picture scanning arrangement. This latter photoelectrically scans the picture original to be composed and printed. The voltage values thereby found which correspond to the brightness values are divided into quantum stages and there are allocated to these stages number values which are conveyed to the high speed phototype setter for composing purposes either directly or with the aid of an electronic store.

The task is therefore set of composing half-tone pictures by means of electronic phototype setters operating by rastering.

This task is solved according to the invention in that the tonal range from white to black is divided into a finite number of stages which are shaded according to a predetermined non-linear function, in that these stages are numbered and the stage numbers are binary coded, in that there is allocated to each code number a raster field whose surface is covered with black to a part corresponding to the tonal value, and in that these raster fields are stored like character pictures in electronic form in the magazines store of the setter, in that furthermore the half-tone picture original to be composed is photoelectrically scanned dot by dot in successive lines or columns, in that at distances which are the same as the distances between raster fields, the tonal value actually encountered is found, the raster number allocated thereto is determined and the corresponding raster dot information is read out from the magazine store of the phototype setter for recording the raster dot on the picture screen of the cathode ray tube.

The task is solved in the following second manner in that the range of tonal values from white to black is divided into a finite number of stages shaded according to a certain non-linear function, in that these stages are numbered and the stage numbers are binary coded, in that to each code number there is allocated a raster field whose surface is covered with black to a part corresponding to the shading value, in that furthermore the half-tone picture original to be composed is photoelectrically scanned dot by dot in successive lines or columns, in that at distances which are equal to the distances between raster fields, the tonal value actually encountered is found, the raster number allocated thereto is determined and fed to a raster dot generator, which produces the voltages and currents for beam deflection and brightness control in order to record the raster dot with the desired black covering and which conveys them to the cathode ray tube of the phototype setter.

In order to compose rastered continuous tone pictures utilizing digitally operating phototype setters, the present invention divide into a finite number of grey stages the tonal range from white to black. The tonal range is divided according to a predetermined non-linear function and each stage is numbered and the stage numbers are binary-coded. There is allocated to each code number a raster field whose surface is covered with black corresponding to the tonal value, and these raster fields are stored in electronic form in the memory storage of the composing apparatus. An original continuous tone picture which is to be composed is photoelectrically scanned dot by dot in successive lines or columns, and at distances which are the same as the distances between raster fields, the tonal value actually encountered is quantized and the raster number associated therewith is determined and stored. When the picture is to be reproduced the address of the storage of the particular raster is read out from the memory and the raster dot is produced on the picture screen of a cathode ray tube. Alternatively, instead of providing a memory from which the picture contents of different raster dots are obtained, a composing program may be utilized to control a raster dot generator which produces voltages or currents for deflecting cathode ray tube beam and controlling its brightness.

FIG. 1 illustrates the electronic rapid phototype setter for composing pictures according to the invention. A control device 1 provides to the composing apparatus 2 data in the form of orders and composing information. The control device may be a computer which supplies data for direct processing in "on-line-operation;" however, it may also have a memory which stores control data produced by computer earlier and at another place and which has been stored for later use. Such data may be decoded in an electronic control unit 3. The electronic control unit 3 provides a first output to an evaluating device 4. The evaluating device 4 is connected to a current supply 5 which has output leads connected to the deflector coil 6 and focusing coil 7 of a cathode ray tube 8. The evaluating device 4 is also connected to a motor 14 which controls a roll of photographic printing material 9 mounted on suitable pay-out and take-up reels. Thus, the control device 1 supplies orders through the electronic control 3 through the evaluating device 4 to control the photographic material 9 and the focusing and deflecting coils 7 and 6, respectively, of the cathode ray tube. The composing orders are also supplied from the electronic control 3 to a character generator 10 which produces all signals necessary for composing the characters. The characters are stored in the form of an electronic information which was previously derived from concrete character originals and stored in a suitable memory with discrete addresses. For composing purposes the characters are read from the memory by using their particular address. The character generator 10 controls electron beam of the cathode ray tube by controlling the brightness to the grid 12. The deflection of the beam is controlled by an output to the focusing coil 7 and an output from the character generator to the current supply which is connected to the focusing coil 7 and the deflection coil 6.

In one embodiment of the phototype setter, the characters are stored in the form of electronic information which was previously derived from actual character pictures and was processed accordingly. For composing purposes, they are read out from memory under their "address," whereby the composing information is available for controlling the electron beam. In the case of a phototype setter of another construction which operates without store, genuine character originals exist which are obtained with the aid of a Flying Spot scanning tube at the time of the recording. In both cases, the generator 10 controls the recording of the character to be composed on the picture screen 11 of the cathode ray tube 8, by acting on the deflection coils 6 of the cathode ray tube with the aid of the current supply device 5, by controlling the focusing coil 71 and by scanning the brightness of the cathode ray with the aid of the grid 12. Luminous pictures of the characters to be composed are formed on the picture screen, which are focused on the photographic material 9 by an optical system 13. The characters are successively composed in lines and the ready composed lines are arranged one beneath the other. This is effected corresponding to the operating orders, either purely electronically by deflecting the electron beam or mechanically by transporting the photomaterial by predetermined amounts. The motor 14 indicates the mechanical film transport. The exposed photomaterial is subsequently developed and is then available for further processing.

Figure 1A:
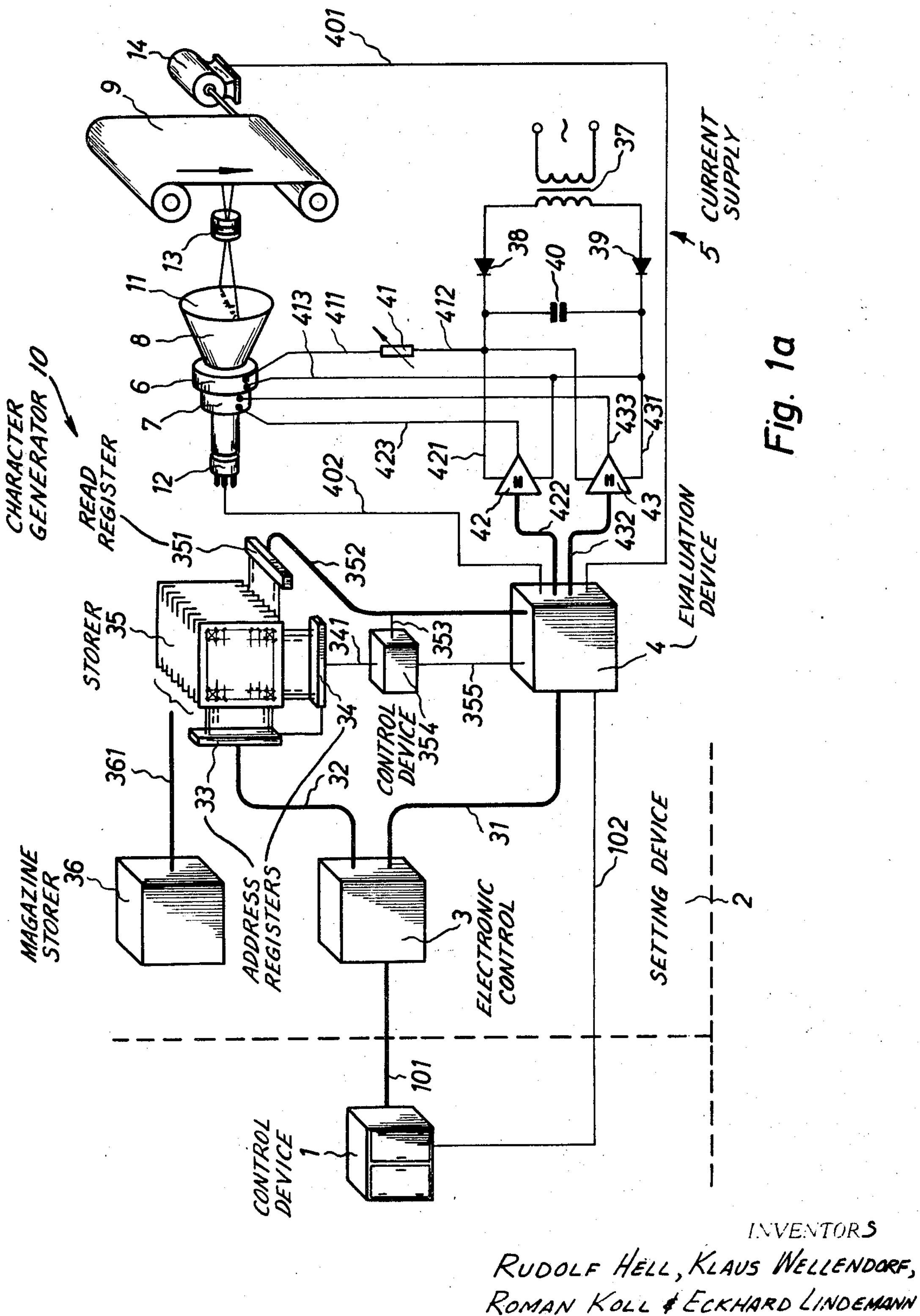
FIG. 1a is a more detailed view of the apparatus of FIG. 1.

FIG. 1*a* is a more detailed illustration of the apparatus of FIG. 1. The control device 1 furnishes control information to the setting device 2, which is illustrated on the right-hand side of the dotted line, via a plurality of lines 101. The control device 1 may be a computer which provides setting information for direct processing in "on-line operation," however, it can also be a storage device which receives the information which has been produced at another place and at an earlier time. The setting information consists of commands for the setting device and determines, for instance, the kind and the size of the lettering to be set, the position of the characters on the picture screen, the transport of the film material, etc. The setting information further contains the addresses under which the data are called up from a storer, and the data called up effect the recordation o tee characters on the picture screen of the electron-beam tube. The setting information which is supplied by the lines 101 is divided in the electronic control portion 3 by a decoding device, according to its content.

Figure 1B:
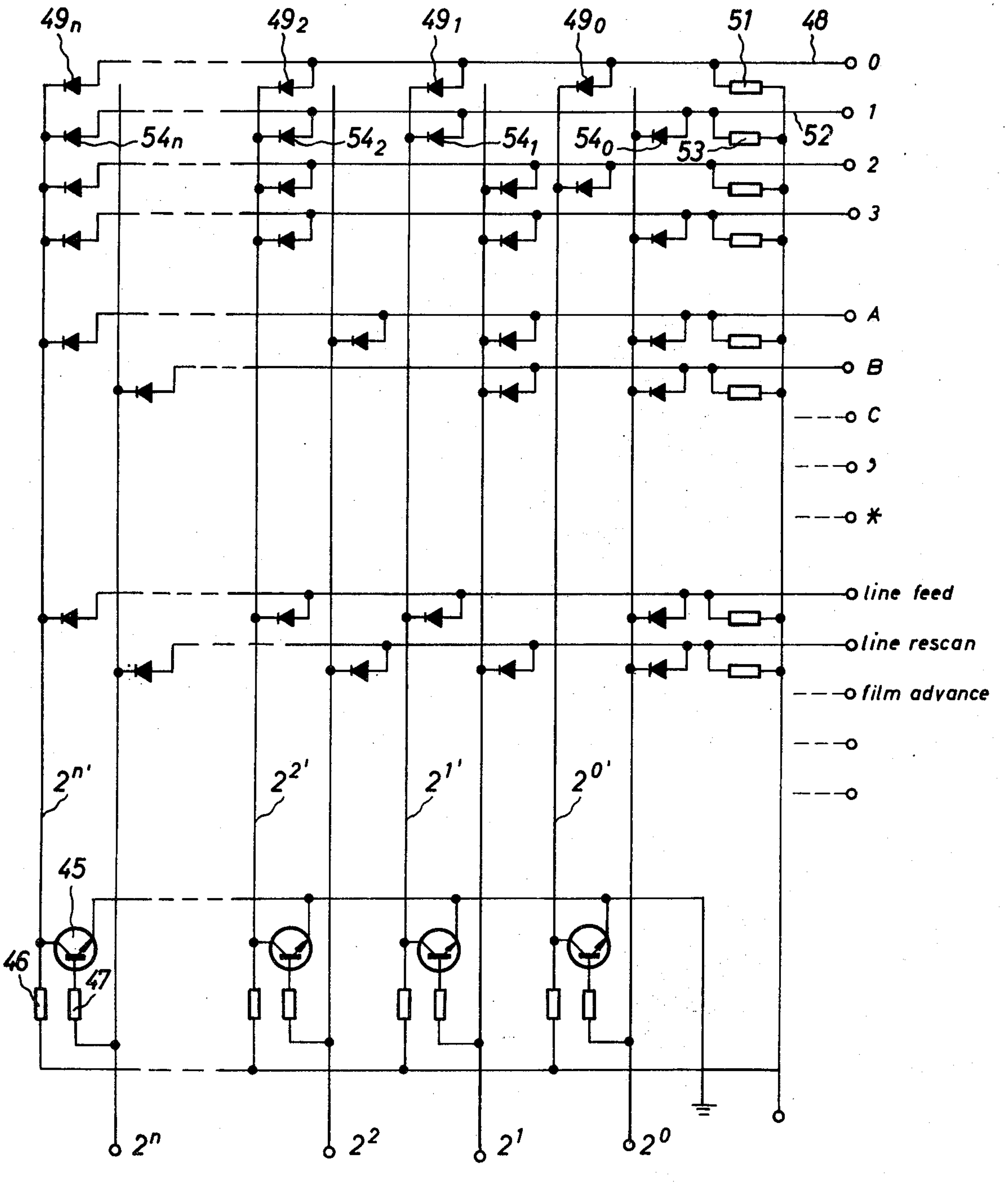
FIG. 1b is a schematic view of the decoding device.

The decoding device is shown in detail in FIG. 1*b*. The commands go the evaluation device 4 via a line channel 31, and in the evaluation device 4, the execution of the commands occurs. The information which is recognized as address, proceeds to the address registers 33 and 34 of the storer 35 via a channel 32. For instance, the address register 33 is provided for the Y-coordinates and the register 34 for the X-coordinates. The storer 35 receives the mentioned data for the character recordation. The storer is an electronic storer with quick access such as a drum memory, a disc memory or an electronic core memory. Before a setting operation is started, the character data are transferred from a magazine storer 36 via a line channel 361 into the storer 35. These data may be obtained by the method described in copending patent application No. 774,767 filed Nov. 12, 1968 entitled "A Method of Producing a Character or Pattern Original for Use in Quantizing a Character or Pattern and Obtaining Digital Data Therefrom by Photoelectrical Scanning" by ROMAN KOLL. These data contain the address at which each character is to be placed in the storer 35. In addition, information about the empty spaces in front of and behind the character and about its width and finally the control data for the light or dark scanning of the electron beam during the recordation is contained in this data.

An electron-beam tube 8 is used for recordation. On its picture screen 11, luminous images of the characters-to-be-set are produced during recordation, which are projected onto photo-material 9 by the optical system 13. The characters are set one beside the other in lines, and the lines which are finished are arranged below one another. This occurs in accordance with the control commands and may be either purely electronically, by means of deflecting the electron beam, or mechanically, by means of the transport of the photomaterial, and, may be under the control of control device 1. A film-transport device 14 such as a motor is controlled by a line 401. After the photo-material 9 has been exposed by the electron beam, it is developed and is then available for offset or relief print.

The current supply device 5 is shown in detail in FIG. 1a in connection with the evaluation device 4. An alternating voltage is supplied through transformer 37 and is transformed into a direct voltage by rectifiers 38 and 39. A condenser 40 smoothes the D. C. signal. The direct voltage controls the focusing coil 6 of the picture tube 8 through a potentiometer 41 and via lines 411, 412 and 413. The potentiometer 41 serves to finely adjust the magnetic field which is produced by the focusing coil in the picture tube, and thus to exactly focus the beam.

The evaluation device 4 controls two deflection amplifiers 42 and 43 which are supplied with direct voltage via the lines 421 and 431. The control is effected via the lines 422 and 432. Lines 423 and 433 connect the deflection amplifiers to the deflection coil 7 for deflecting the beam. The beam deflection consists of a position deflection and an intelligence deflection. The position deflection indicates the point where the character is to be recorded, and the intelligence deflection causes character to be produced. The coordination of the position deflection and the intelligence deflection occurs in the evaluation device 4 according to the program instructions and the information which is called up from the storer 35. The deflection generators for the X and Y deflection are not illustrated in detail since these are common generators as used, for example, in the television technology.

If address information of a character is contained in the setting instruction from the control device 1 to the storer 35 via the line 101, the electronic control decoding device 3, the line 32 and the registers 33 and 34, the address of the first storage cell of a large number of storage cells which are arranged one beside the other will be called up. The information which is contained in this first cell is read out of the register and transferred into the evaluation device 4 via a channel 352. Simultaneously, the following operation cycle begins. When the register 351 is read out, an impulse reaches the control device 354 via line 353 which is assigned to the storer 35. The control device 354 contains an electronic adder. The address number is increased by "1" by means of this impulse and is supplied via line 341 to the address registers 33 and 34. Thus, the cell will be read out which is adjacent to the first read-out storage cell and the information is furnished to the evaluation device 4 via the line 352.

A new impulse causes a further increase of the address number and the reading of the next adjacent cell. This process continues until a control register which is contained in the evaluation device 4 stops this process by means of an impulse via the line 355. The control register is filled with numbers which indicate the width of the character and the spaces in front of and behind the character. These numbers are contained in the recorded information of the character and form the beginning of the information word.

When the transmission of a character is completed, a signal comes to the control device 1 via a line 102 which causes a new character to be called up for setting. The information which is supplied from the read register 351 via the line 352 controls the horizontal and vertical deflection of the electron beam and controls the scans of image dot. Brightly scanned portions of the picture lines form a luminous picture of the character to be recorded on the picture screen of the electron-beam tube which is then further processed via the optical system and film material to obtain the desired printing master.

FIG. 1b is an electrical schematic of a decoding device of FIG. 1*a*. Lines designated $2^0$ through $2^n$ correspond to the line group 101 in FIG. 1*a*. The binary coded setting information is supplied via lines $2^0$ through $2^n$. The information consists of voltages that may have plus or minus polarities which appear on the core leads $2^0$ through $2^n$. Thus, $2^n$ different information units are possible which may represent characters, numbers, signs and commands. The decoding device contains n transistor stages which are shown as inverters and which are connected respectively to one of the input lines $2^0$ through $2^n$. There is always a potential at the output lines $2^{0'}$ through $2^{n'}$ which has the opposite potential of that at lines $2^0$ or $2^n$. At stage $2^n$ for example, a minus potential might be furnished its input electrode which might also be ground potential. Since the emitter has also ground potential, the transistor 45 is blocked. A positive potential appears at line $2^{n'}$.

If the potential at line $2^n$ changes to positive, current will flow via the resistor 47 and from the base of the transistor 45 to the minus terminal. The transistor therefore conducts. Due to the voltage drop through resistor 47, the potential at line $2^{n'}$ drops to a value near to the minus voltage. The same effect will occur with all the line pairs $2^0$ or $2^{0'}$, $2^1$ or $2^{1'}$, etc.

The line pairs form trunks in a diode matrix which is illustrated in the upper part of the circuit diagram of FIG. 1b. The diode matrix contains $2^n$ (equal to m) output lines which correspond to the various information units. These are composed of numbers, characters, signs and commands. Based on their meanings, the output terminals in the circuit on the right-hand side of FIG. 1b are labeled 0, 1, 2, etc., A, B, C, etc., comma, asterisk, etc. They may also be designated as commands such as "line feed," "line rescan," "film advance," etc. The individual output lines are connected through the diodes with one core lead respectively of the line pairs $2^0$ or $2^{0'}$, $2^1$ or $2^{1'}$, etc., such that one and only one output line or output terminal contains a voltage with each possible one of the $2^n$ code combinations. If, for instance, a minus potential appears at all of the input lines $2^0$ through $2^n$, all lines $2^{0'}$ through $2^{n'}$ will have a positive potential. The line 48 is connected to these lines by means of diodes $49_0$ through $49_n$ respectively, which have their anodes connected to line 48. Plus potential is supplied the line 48 and the outlet terminal assigned to it via a resistor 51. Since the cathodes of the diodes $49_0$ through $49_n$ also have plus potentials, no current can flow and a plus potential remains at line 48. The line 48 is assigned to the number "0."

If the setting information at the core leads $2^0$ through $2^n$ changes, while a positive potential is applied to the core lead $2^0$, the core lead $2^{0'}$ is inverted to a minus polarity. Now current flows from the positive voltage source to the core lead $2^{0'}$ via resistance 51, line 48 and diode $49_0$. Due to the voltage drop through the resistor 51, the potential at line 48 drops to a value near zero.

Then line 52 receives a positive potential. The line 52 differs from line 48 only in that the cathode of the diode $54_0$ is connected to line $2^0$ instead of, as in the case of line 48, with line $2^{0'}$, Since, however, the core lead $2^0$ contains positive potential and the cathodes of the remaining diodes $54_1$ through $54_n$ are connected with the core leads containing the positive potential $2^{1'}$ through $2^{n'}$, no current can flow and the positive potential of line 52 becomes effective at the terminal. This terminal has the numerical value "1."

With the diode matrix all m–1 outlet lines and terminals which are not assigned to the information appearing on core leads $2^0$ through $2^n$ at least one of the n connected diodes finds a minus potential at its cathode side. The currents which flow through the resistors 51, 53 . . . drop the potentials at the output terminals to nearly zero, due to the voltage drops. On that one which corresponds to the information line that contains a positive potential it determines the stated value of the setting information.

The system allows $m = 2^n$ measuring informations to be evaluated. If for instance $n = 6$, $m$ will be $= 64$. This number can be subdivided into for instance 10 numbers, 30 characters, 10 signs and 14 setting instructions or commands.

The cathode ray tube 11 produces pictures of the characters to be composed on the screen 11 in response to the control device 1, the electronic control 3, character generator 10, the current supply 5 and the evaluating device 4. The pictures on the screen 11 are transmitted via the lens system 13 to the photographic material 9 where a latent image is produced. The photographic material 9 is synchronized with the characters on the screen 11 to produce the desired master photographic copy and is subsequently developed to provide the photographic master. The characters are composed in lines on the photographic material and this may be done either by electronically deflecting the electron beam or by mechanically moving the photographic material 9 with the motor 14.

So as to record grey tone pictures with the phototype setters of this type, a large number of small character patterns must be composed. The size of the raster fields which are closely adjacent to each other and beneath one another in lines allow the grey shading of the picture to be varied in accordance with the selection of a particular raster.

The position and extent of the raster dot in the raster field, the so-called black covering, are stored in binary coded form in the ring core memory of unit 10 for ready access. Each raster dot has a particular address and may be readily recalled. Each character, figure or the like may be composed of raster dots and stored in particular memory unit of the memory. The raster dots may also be composed of different elements.

When characters are recorded, two deflection controls of the electron beam are superimposed on one another. The first is the center-of-gravity control. It determines the position of the dot to be composed, controls the start of a line, the distance between the dots, the restart of a line and the line step. The second deflection control which controls the gating and blocking of the electron beam, controls the recording of the character at the stop given by the center-of-gravity control. The raster dot receives its shape by the deflection control.

The composing of half-tone pictures by rastering with the aid of the electronic phototype setter may be carried out in three different methods. In the first case, the function of the phototype setter is completely maintained. There is no interference in the setter. The raster fields with different black coverings are stored like character information in the store of the setter or exist as genuine picture originals. In the second case, the center-of gravity control of the phototype setter is maintained; the recording of the raster fields with their various covering values and shapes is controlled with the aid of an additional device by acting on the deflection members of the cathode ray tube in the phototype setter. In the third case, the center-of-gravity deflection is effected with an addition device. The control of the phototype setter is at rest during the picture recording.

Corresponding to the first case, the raster fields with different covering values are conceived as small characters with different black-white content. They are constructed as usual characters and are treated like them. They have their identification which consists of the address under which they are stored and can be read out, which furthermore consists of statements regarding the construction of the dot, e.g. the effective width of the black pattern in the raster field, furthermore of the empty space existing between the raster field edges and the pattern, finally of information regarding the shape and size of the black pattern.

Figure 2:
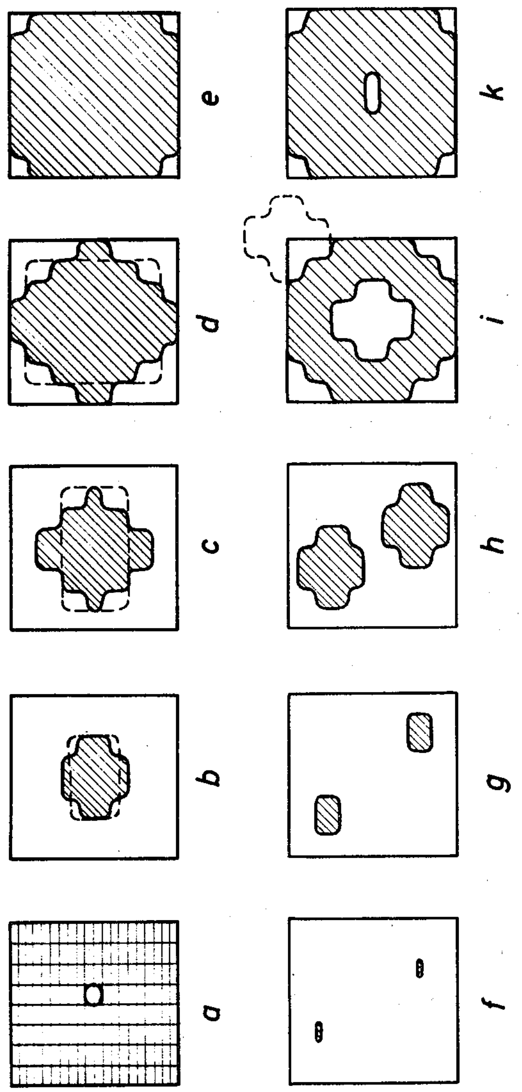
FIG. 2 illustrates raster fields of different shapes and sizes.

A raster dot field which is intended for recording a picture in newspaper printing, has a side measurement of about 0.33 mm. The black covering of a dot field is effected by an accumulation of very small units whose size is determined by the light point of the cathode ray tube, which exposes the film material. The light point brushes over the whole field in adjacent vertical picture lines which themselves are divided into units. The black pattern is thereby formed by the gating and blocking of the light point. In order to know from how many picture lines and how many minimum units per picture lines which themselves are divided into units. The black pattern is thereby formed by the gating and blocking of the light point. In order to know from how many picture lines and how many minimum units per picture line this raster to be composed of small characters can be formed, a comparison is made with a character usual for the phototype setting of the character size 5· (=5 dot). ("Dot" is a typographical unit of size, 1· =0.376 mm). The character of the size 5· is therefore 1.88 mm high. A "square em quadrat,"which is a square with side measurements of 1.88 mm, consists of 50 vertical lines which are each divided into 120 minimum units. The sides of a raster field are about one-sixth of the 5·–character height, equal to 0.314 mm. This results in the division of a raster field into approximately eight vertical lines each with 20 minimum units. The raster field a in FIG. 2 is correspondingly divided into 160 units. Just as large a number of raster fields with black covering increasing from white to black could be established and coded if the covering increases by a minimum element per stage. This division would produce a linear distribution of the increasing values of the raster field row in the case of a total number of 160 raster fields.

FIGS. *2a–k* show a few raster fields with different covering falues in large format. Because the light spot of the electron beam is circular, a rounding of tee corners and edges of the covering spots occurs due to below-threshold exposure of adjacently exposed dots, as may easily be seen from the drawing. This rounding has a favorable effect on the shape of the spots.

The covering spots in the fields may take many shapes. In the first row, spots are shown with size increasing from FIG. 2*a* to FIG. 2*c*, which are arranged at the center of the field. The grouping can be such that the basic shape is approximately a square lying on one corner, as may be seen in particular from fields in FIGS. 2*c* and 2*d*. With increasing covering, the corners of these square abut on the sides without overlapping.

Figure 3:
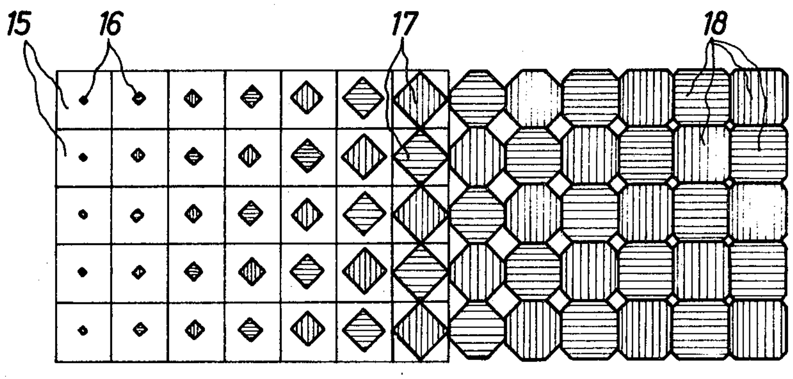
FIG. 3 illustrates a surface formed from raster fields of FIG. 2 and which is increasingly blackened from left to right.

FIG. 3 shows this shape with raster spots increasing in blackness from left to right. The square 15 represents the mesh structure of the raster. The raster spots 15 are allocated to picture parts with bright grey values. They are small and do not touch one another; the quadratic spots of the fields 17 are covered by 50 percent. They represent an average grey value. The corners of the spots touch one another. Finally, the raster fields 18 are considerably covered and correspond practically to a complete blackening. Only at the corners do small white surfaces remain. They form bright spots on a blackened background in a dark picture part with adjacent, also considerably covered fields. Seen from a greater distance, the individual raster fields with their spots cannot be recognized individually by the eye. The surface shown in FIG. 3 appears to have its blackening uniformly increasing from left to right.

It is still to be noticed that the spot shapes do not have to take the form of a square or a rhombus standing on one corner. Shapes are also possible which are similar to rectangles whose sides are parallel and vertical to the horizontal axis. In the fields shown in FIGS. 2*b*, 2*c* and 2*d*, these rectangular shapes are shown in dotted lines. Both shapes are basically equivalent since the spots are so small that they can no longer be observed individually by the eye. The choice of the shape of the spot is determined by the printing process. For reasons which go beyond the framework of the invention, it may be desired that the covering spots in the raster fields have completely different shapes.

Such a modification of the shape is shown for example in the fields shown in FIGS. 2*f*–2*k*. the spots in the fields FIGS. 2*f*, 2*g* and 2h are separate. Grey shaded parts of a picture which are formed from the fields FIGS. 2*f*–2*h* have the same blackening values as the picture parts with the fields of FIGS. 2*a*–2*c*. By doubling the number of spots, the raster receives, however, a finer structure. From a raster with 30 meshes per centimeter, a raster with 30. $\sqrt{2} = 44$ can be made. However, this doubling does not concern only the grey areas of low tonal values but also the dark picture parts. See FIGS. 2*i* and 2*k*, for example, which have raster fields with covering. The covering surface of the field FIG. 2*i* is the same size as that of the field FIG. 2*d*. However, it is annular, so that a white core is formed which is equal to the sum of four equal white corner pieces. If the field FIG. 2*i* is part of a picture part with constant blackening, the adjacent fields are also the same as the field FIG. 2*i*. At the spot where four corners meet, a white spot is formed with a black surrounding. The outlines of this spot are shown in dotted lines on the upper edge of the field FIG. 2*i*. This white spot is the same as the white spot in the center of the field. The dark grey picture part now contains in all double the amount of white spots in the black surrounding field than in the spot shape corresponding to the field FIG. 2*d*. Also the field FIG. 2*k* with very deep grey tone is formed thus. The small white spot in the core with four units is the same as the spot which appears at that position where the four corners of fields of the shape FIG. 2*k* abut. At the point of contact of four fields of the shape FIG. 2*c* an individual white spot of eight units is formed which is equal to the sum of two spots, one in the core and one on the point of abutment of the corners of four fields. Also in parts of considerable blackening, the number of rater dots, white dots on a black ground, is doubled and consequently the raster detail is increased.

Figure 4:
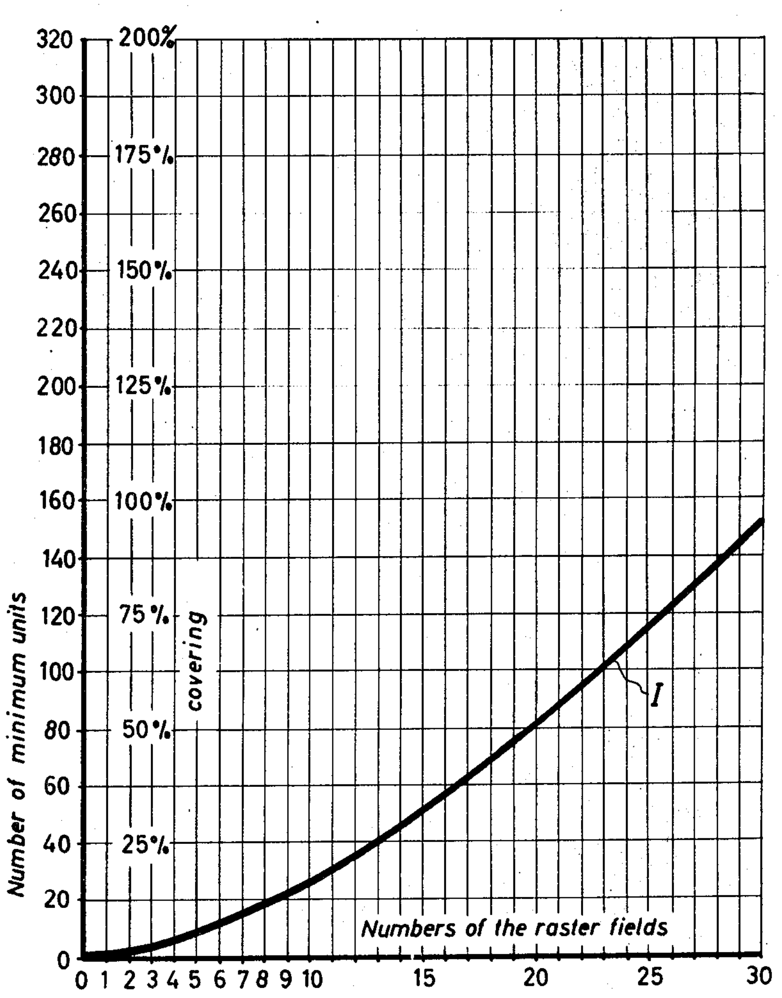
FIG. 4 is a plot of a pair of physiological curves.

Experiments and experience have shown that the number of tonal stages between white and black can be limited to a relatively small number. About 30 stages are sufficient for composing newspaper pictures However, one requirement must be fulfilled: the black values of successive stages should not increase linearly but must follow a quite determined function. This function, the so-called physiological function, takes into account *inter alia* in particular the sensitivity of the human eye. The ability of the eye to differentiate tonal differences is very much better in bright picture parts than in the dark parts. It is therefore necessary to stagger the covering values of the raster fields according to the physiological curve shown in FIG. 4, if it is desired to subsist with a minimum of brightness stages. The abscissa of the curve recording has thirty numbers at equal distance from one another which are allocated to the raster fields. The ordinate give s the number of minimum elements which contribute to covering the raster fields. Curve I shows the covering in the white region increases by only one or two minimum elements per stage, while the increase in the black region amounts to about eight to nine elements.

Figure 5:
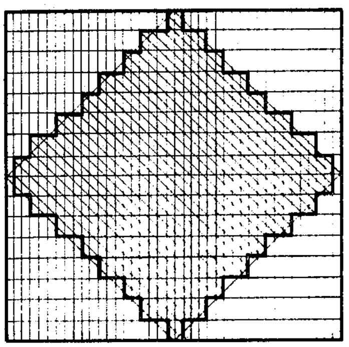
FIG. 5 illustrates a diamond shaped raster field.

Corresponding to the structure of the phototype setter, the sides of the raster dot fields are oriented parallel and vertical to the horizontal line. Accordingly, the raster fields known from FIG. 2 arranged adjacent and beneath one another without holes and overlapping. In printing, however, this shape of the raster fields is not always applied. The rotation of the raster fields is preferably through 45°, so that the diagonal of the quadratic or rhombic raster field is vertical to the horizontal line. The recording co-ordinates of the phototype setter and also the sides of the raster dot field run parallel and vertically to the line. Therefore it is advantageous to construct the raster fields as shown in FIG. 5. The square which has been shown staggered and which could contain the covering information, is inscribed in a large square with sides running parallel and vertically to the horizontal. This larger square is the raster dot field as it must be measured for the phototype setter. Its surface is double the size of the staggered surface of the inscribed raster square which contains, as useful square, the covering information.

Figure 6:
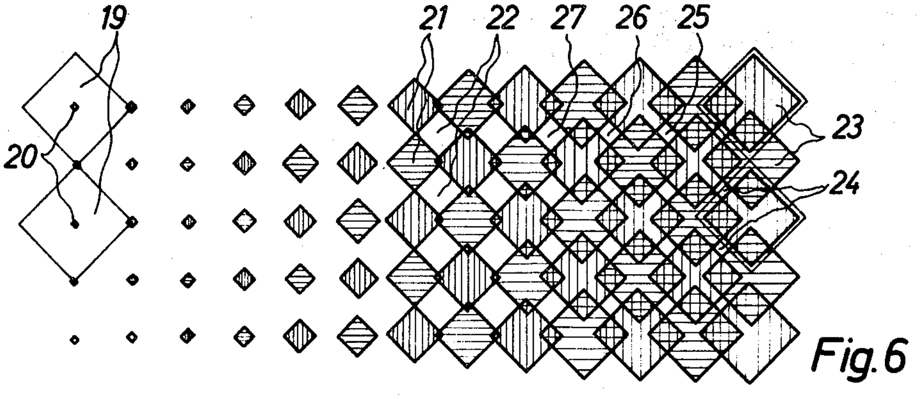
FIG. 6 illustrates a surface formed with diamond shaped raster fields which overlap and which become increasingly blacker towards the right of the figure.

According to the structure of the rastering with inclined raster fields, the useful raster *per se* must however be double the size of the raster fields according to FIGS. 2 and 3. The reason for this is that adjacent squares overlap one another more and more if the black covering exceeds 50 percent. In the case of complete blackening of a picture part, each point is covered by two raster fields, it is thus doubly covered. FIG. 6 clearly shows this relationship. The squares 19 represent the mesh structure of the raster. The raster spots 20 are small and do not touch one another. They represent the bright parts of a picture. The spots 21 correspond to a 50 percent black covering, thus an average grey value. The spots touch one another at their corners. If they have uniform blackening in a larger picture part, then the same size non-blackened spots 22 are formed between the blackened spots. The rater spots 23 correspond practically to complete blackening. They mutually cover one another so that approximately the whole field is doubly covered. Only at points 24 does there remain small white spots on a blackened background. These white spots are greater when the grey values are lower, as spots 25, 26 and 27 show.

If one takes as a basis the raster grid measurement as in the example of FIG. 2, thus 0.315 mm distance between the raster fields and the lines, then the sides of the raster field of FIG. 5 must be $\sqrt{2}$. 0.315 mm, so that it is double the size of the raster field shown in FIG. 2. Since, however it is inscribed in the character field which is also double the size, the measurement of this field is 2 degree 0.31 mm side line. The field division into individual elements consists of 18 vertical lines to each of 40 minimum units. This division based on FIG. 5 produces 640 units in all. However, since for printing purposes only the fields covered by the small inscribed square can be used, the whole covering extent is 320 minimum units, is thus always double that which is obtained by the number of units of the raster field corresponding to FIG. 2*a*. The raster division is the same as in the examples of FIGS. 2 and 3. This means that the number of minimum elements which contribute to forming covering spots, correspond for the stages up to about 50 percent covering in both cases. If the values are higher, adjacent fields overlap one another even more as shown in FIG. 6. It may be assumed that a simple covering produces complete blackening, therefore that by overlapping covering surfaces no additional blackening is caused. The reason for this fact lies in that, for recording, lithofilm material is used whose gradation curve is very steep, and that with the exposure corresponding to a simple covering, saturation of the blackening is already achieved. The enlargement of the spots which passes over 50 percent of the raster surface thus contributes only 50 percent of the further blackening. Therefore, for forming a raster field with determined grey value increase, the number of the necessary surface elements must be much higher than is necessary in the rastering which does not overlap.

The raster shape according to FIGS. 5 and 6 therefore appears to be less favorable than the shape corresponding to FIGS. 2 and 3. The decision as to which shape is to be applied depends, however, upon the printing process to be applied. From the printing process, still further choices regarding types of raster and raster field shapes can be made. Also, a rotation of the whole raster grid axis system through certain angles is usual in order for example to print color separations of a picture above one another. With the aid of the phototype setter, this requirement may be fulfilled. A program is required which is effective to order the apparatus of the phototype setter to produce the desired patterns, but the formation of the program for the computer do not form a part of this invention, but are well known to those skilled in the art.

According to methods of the prior art, the covering values are sums of whole numbered multiples of minimum elements of determined size. Since a raster field can include only a relatively small number of elements, particularly when the raster is fine, the adaptation of the covering values to the physiological curve is difficult. Only a staircase curve can be obtained with very variably high stages. A further method of producing raster fields with covering values which increase according to any function, and wherein there may be any number of stages, is as follows: An individual raster generator is used and the covering spot is recorded on the picture screen. Such a generator is an ancillary device to the phototype setter. It acts directly on the deflection coils, the focusing coils and on the grid electrode of the cathode ray tube.

The composing information which the phototype setter requires for composing a half-tone picture is supplied by a scanning device. The information scanned by the picture original is first a D.C. voltage which varies from minimum to maximum values corresponding to the gating — blocking values of the picture original. This D.C. voltage is fed to a resistance chain which consists of as many individual resistors as there are stages, which is necessary for good quality picture recording. The resistance values of the individual resistors of the chain are measured corresponding to the physiological curve.

The size and shape of the raster spot can be produced in different manners.

A good method comprises not using the recording deflection of the electron beam by maintaining the center-of-gravity control by the phototype setter and of controlling only the size and beam intensity of the light spot. The light spot has the shape of a circular surface whose size is controlled with the aid of a focusing coil and its brightness with the aid of a control grid. In order to maintain as constant as possible a blackening of the photomaterial in all spot sizes the intensity of the beam current must be proportional to the spot size. This is a function of focusing and varies as the square of the spot diameter.

Figure 6A:
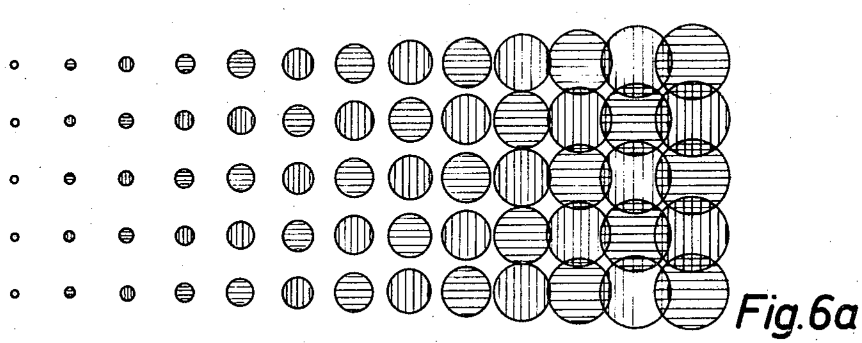
FIG. 6a illustrates a surface with circular spots formed from overlapping rasters and in which the blackening increases from left to right relative to the figure.

FIG. 6*a* shows an enlarged picture surface with covering values increasing from left to right. It is to be noted that the covering of the raster fields in circular surface shape increases about the factor $\pi/2$ more quickly than in the square shape. This mean that 78 percent of the covering is obtained if the circular raster spots touch one another. With further increase of the spot size, adjacent spots overlap one another but there is never double covering of the spot surfaces, even in the case of completely black picture parts. A physiological curve suitable for this case would deviate from the curves shown in FIG. 4.

Raster spots with circular disc shape are seldom used in the printing industry. As mentioned, the square shape is usual with diagonals standing vertically on the horizontal axis.

In order to produce raster spots of square shape, the recording of Lissajous figures is utilized. If the deflection of the beam of a cathode ray tube in the horizontal and vertical axis is supplied with the same deflection currents of high frequency A.C. voltages but of different frequencies, the electron beam designates a square whose whole surface is shown brightly by the repeated beam. If each of the two generators are connected to a deflector means, the sides of such square lie parallel and vertical to the horizontal axis. If the amplitudes of the voltages are different, the squares change to rectangles which are vertically or horizontally extended according to whether the vertical or the horizontal deflection is predominant. If both generators with equivalent voltages are allowed to act on both deflector means, a square is formed whose diagonal is vertical to the horizontal axis.

Figure 7:
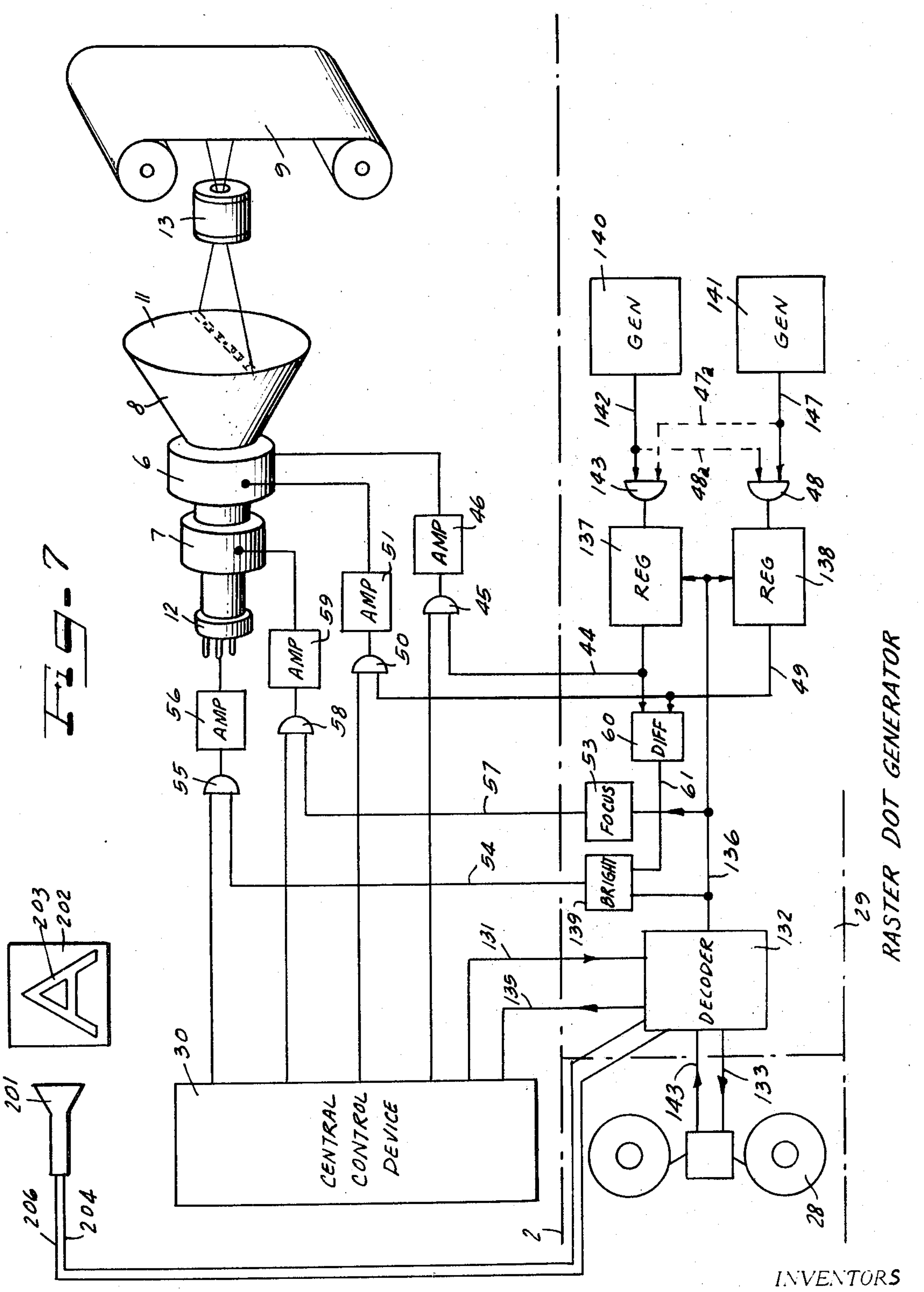
FIG. 7 illustrates the structure of the raster dot generator.

FIG. 7 illustrates a raster generator suitable for controlling a phototype setter, which generator operates in the following manner. It has worked very successfully in practice and is described in detail.

The recording of the half tone picture with the aid of the phototype setter generally results in the scanning of the picture original with the aid of a scanning device and the production of the control information which is necessary for re-recording the picture. The whole chain of the control information is stored in an electronic storer and is available at any time for picture composing with the aid of the phototype setter. Direct control of the phototype setter from the picture scanner, the so-called "Life-method" is of course also possible. In this way, the scanning device is controlled by the phototype setter, the original is scanned synchronously with the recording and delivers all information without intermediate storing immediately to the phototype setter. This life method requires a very rapid scanning device operating according to the Flying-Spot process, the scanning of the picture original being effected with the aid of an electron beam — picture transducer.

Let it be assumed for our description that the information necessary for controlling the picture recording is stored. A magnetic tape or a magnetic drum or plate store is suitable as carrier for the information. A punched tape store would operate too slowly and a core store would probably be too expensive since a very large number of data combinations is necessary for recording one picture.

On the bottom left hand side of FIG. 7, a magnetic tape device 28 serving as store is shown, and adjacent this the block diagram of the raster dot generator 29 is illustrated. Above the dotted line, the most important elements of the phototype setter are shown.

Should, in the course of a composing order, a rastered picture be composed, a read out arrive at the magnetic tape store 28, in the form of a binary information group, from the central control device 30 of the phototype setter via the lead 131, the decoding device 132 and the lead 133. The store starts and then takes over the control of the phototype setter and the raster picture generator. The picture composing information reaches the central control device 30 of the phototype setter from the store 28 via the lead 143 and the decoder 132 partly via the lead 135. These give the positions which are the center-of-gravity co-ordinates, for the raster dots to be recorded and furthermore all functional orders necessary for the phototype setter. The other information determines the covering values of the raster dots to be recorded. They reach the regulating means 137 and 138 and the brightness control 139 via the lead 136.

The generators 140 and 141 deliver the A.C. voltages of different frequencies necessary for forming Lissajous figures. The A.C. voltage of the generator 140 is conveyed via the lead 142 to the mixer 143. From there it arrives, via the regulating switch means 137, the lead 44 and the adder-mixer 45 at the amplifier 46 which feeds the vertical winding of the deflector coil 6. The A.C. voltage from the generator 141 arrives, via the 147, the mixer 48, the regulating switch means 138, the lead 49, the mixer 50 and the amplifier 51, at the horizontal winding on the deflector coil 6. A quadratic field whose sides run parallel and vertical to the horizontal axis is recorded on the picture screen 11 of the cathode ray tube. The total surface of the field is, as mentioned, bright, so that a completely black quadratic spot is produced on the photomaterial. The size of this spot depends upon the voltages at the output leads 44 and 49 of the regulating switches 137 and 138.

Apart from the functional orders, such as film advance, beginning of composing for picture and line path and statement of the advance step for the film, two data combinations per raster field are delivered by the store 28 to the decoder 132. The first combination goes as an order for adjusting the center-of-gravity position for recording the raster via the lead 135 to the control device 30 of the phototype setter. The second combination is interpreted as the number of covering values which the raster field to be composed should have. It is conveyed via the lead 136 to the regulating switches 137 and 138, by means of which the A.C. currents supplied by the generators 140 and 141 are regulated to the theoretical values and are conveyed to the deflector systems. Corresponding to these theoretical values, a certain number of amplitudes may be set with the aid of voltage dividers in the regulating switches 137 and 138. The number of these adjustable values is equal to the whole number of the quadratic black spots which are necessary for picture recording. They extend from a minimum value which is approximately zero to a value which corresponds almost to the whole black covering of the raster field. AS mentioned above, about 30 has been named as sufficient for the number of these blackening stages. It is possible to obtain higher quality by raising the number of stages.

The resistors of the voltage divider chains in the regulating switches are divided corresponding to the physiological curve. The connection of the individual voltage stages to the leads 49 and 44 is accomplished in conventional manner with the aid of transistor switches as is well known to those skilled in the art.

It is possible to record the quadratic spot on the picture screen so that the diagonal is vertical to the horizontal axis. To accomplish this the connections of the leads 142 and 147 must be made in the raster dot generator. Each of the two generators 140 and 141 then controls the horizontal and vertical deflection simultaneously, so that the new system of axes divides in half the angles formed by the first system of axes. It is therefore inclined by 45° with respect to the horizontal axis.

Other variations of the shape of the covering spots are possible by voltage dividers being inserted in the dotted coupling leads **48*a* and 47*a*. Also, since the voltages of the generators 140 and 141 are made unequal, and as the couplings via the dotted leads 142 and 47** are different, the shape of the spot can be altered within wide limits.

Figures 8A, 8B, 8C, 9:
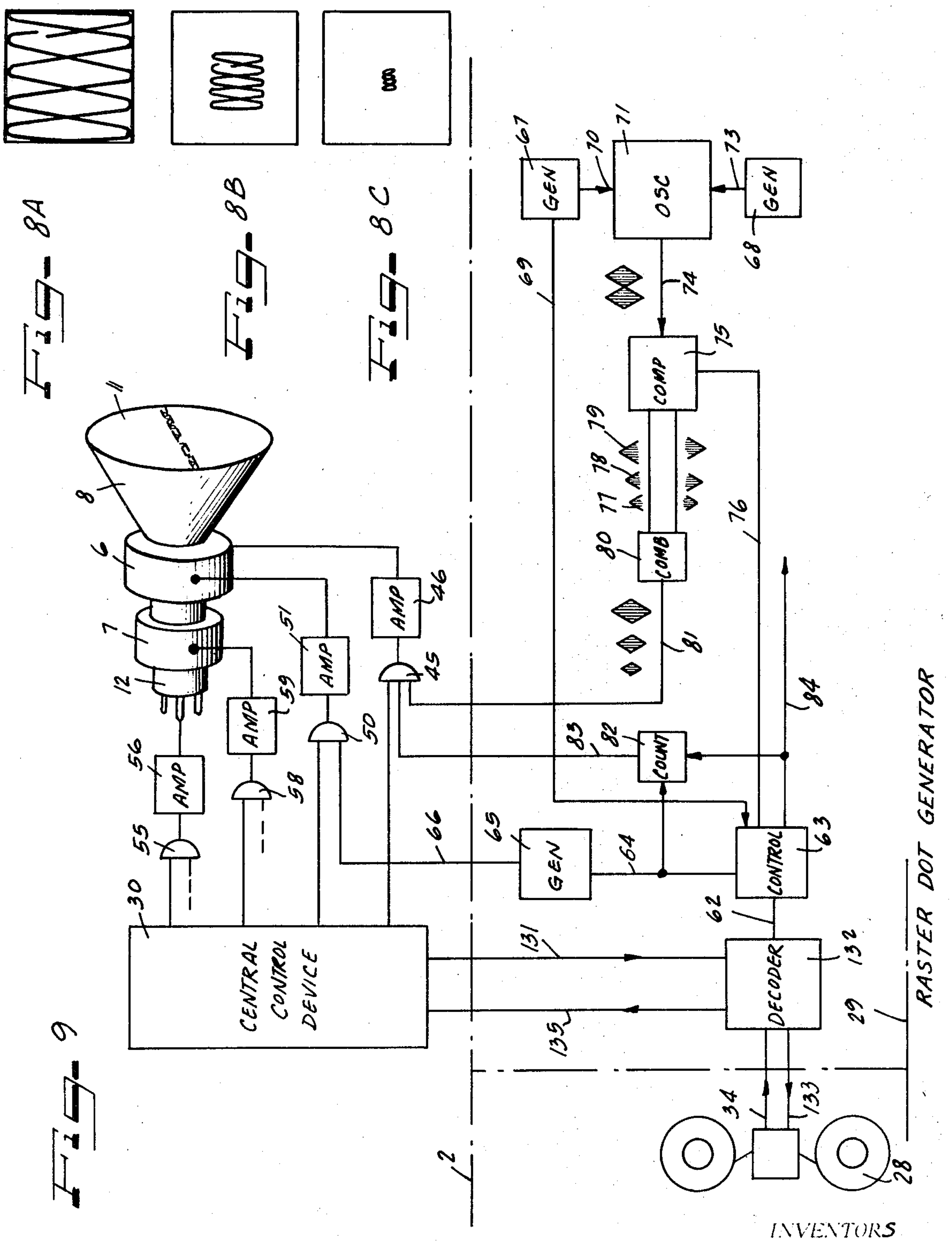
FIGS. 8A–8C illustrate examples of the formation of dots.
FIG. 9 comprises a circuit diagram of the raster dot generator which uses A.C. pulses in a Δ- shaped wave form.

FIGS. 8A–8C show three raster fields with black coverings of different size each with a few line curves of Lissajous figures inscribed therein. In actual practice, during the recording of a raster field, so many lines wander over the field that the whole field is completely blackened. Due to the difference in frequency of the deflection voltages in both directions, periods are not formed during the curve recording by the electron beam on the picture screen, which are shorter than the recording time of a raster field. When periods occur, the covering surface could be exposed in non-uniform manner since equal curves would be recorded above one another several times at the same spots. These curves would be strongly predominant in the covering field so that no uniform blackening occurs.

Two further factors must be taken into account if it is desired to obtain uniform and homogeneous blackening of the covering field. First, the light intensity which produces the covering spot must be controlled. In order to obtain as uniform a blackening as possible not only of the very small spots allocated to the bright picture parts but also of the large spots corresponding to the dark picture parts, it is necessary to control the intensity of the electron beam in dependence upon the size of the spot. This occurs by supplying the voltage applied to the lead 136, to the brightness regulator 139 and focusing regulator 53 as well as to the regulating switches 137 and 138. Depending upon the size of the covering field to be recorded, the control grid 12 of the cathode ray tube 8 and consequently the intensity of the electron beam is regulated via the lead 54, the adder 55 and the amplifier 56, and also depending upon the theoretical size of the covering field, the current is controlled via the lead 57, the adder 58 and the amplifier 59, by the focusing coil 7, which determines the diameter of the light point of the electron beam. In order to obtain uniform blackening in the case of small and large covering fields, the light point must, in the case of small fields, have a very small diameter and in the case of large fields a large diameter.

The second factor to be considered is that the velocity of the light point in the recording of a covering field, when passing through the central region, is faster than on the edge, particularly at the corner regions, for the movement follows sine functions in both axial directions. In order to compensate for this non-uniformity of exposure which is determined by velocity, the leads 44 and 49 which conduct the deflection voltages for both axes, are connected to the differentiator 60. Voltage changes on the leads 44 and 49 are proportional to the velocity of the electron beam. The voltage obtained by differentiation of this voltage change on the output lead 61 of the differentiator 60 is conveyed to the brightness regulator 39 which controls the beam of the cathode ray tube so that it is brighter if the velocity of recording of the picture point is high.

The adders 45, 50, 55 and 58 may be operational amplifiers with two (or more) absolutely equivalent inputs. This results in a completely equivalent control of the recording block of the phototype setter not only of the control part of the phototype setter but also of the additional raster generator.

Another way of controlling the phototype setter is to produce characters 203 on a suitable background 202 by hand or photographically and then photo-optically scan them with a scanner 201 which is connected by leads 204 and 206 to the decoder 132. The signals from the scanner 201 are utilized to control the pattern on the screen 11 under control of the central control device 30 of the phototype setter. It is to be realized that a complete complement of characters is to be stored in the central control device 30 and may be selectively reproduced under the control of the phototype setter.

A third method of composing half-tone pictures with the aid of the phototype setter, the so-called center-of-gravity control of the deflection of the cathode ray tube is accomplished, as mentioned, by the additional raster dot generator. FIG. 9 shows the main circuit diagram of this generator. In the part above the dashed and dotted line, the important components of the phototype setter are shown for a clearer understanding. The same components are shown as in FIG. 7 and they have the same designations thereas.

Should within the framework of a composing problem a half-tone picture be composed, a requirement order first passes from the ordering device which controls the phototype setter system, via the central control apparatus 30 which controls the internal operations of the phototype setter, via the lead 131 to the decoder 132 of the raster dot generator. This latter reproduces the requirement in the store 28 allocated thereto, via the lead 133. Said store could also be a picture scanning device in Life-operation. With the start of the store or the picture scanning device, the composing information begins to flow via the lead 134 to the decoder 132 of the raster generator. This information first consists of a start combination which reaches the horizontal deflection generator 65 via the lead 62, the control device 63 of the raster spot generator and the lead 64. The generator is a saw-tooth generator. It controls the horizontal winding of the deflector coil 6 via the lead 66, the adder 50 and the amplifier 51. The electron beam moves by this control at uniform velocity from a starting point on the edge of the recording screen over the picture screen until a return pulse stops this movement, effects the return of the beam and starts a new horizontal movement. The generator thus controls the recording of the horizontal raster lines.

Both generators 67 and 68 are provided for controlling the vertical deflection. The generator 67 has two tasks. It delivers, via the lead 69, clock pulses whose frequency is equal to the frequency of the raster recording, for example 5000 Hz, to the control device 63. Moreover, it delivers, via the lead 70, a saw-tooth A.C. voltage with sawtoothed shaped curve to the oscillator 71. The generator 68 with a comparably high frequency of, for example, 100 kHz, also delivers via the lead 73 an output to the oscillator 71. On the output lead 74 of the oscillator rhombic A.C. pulses of frequency 5,000 kHz occur which are filled in with high frequency signals of 100 kHz. These reach the comparator 75. The information which is fed further via the decoder 132 and which contain the data for covering the raster spots to be composed, reach the control device 63 and are there converted into D.C. voltages whose values correspond to the data of the information. The D.C. voltage at a particular time reaches the comparator 75 via lead 76. In a comparison bridge, it is subtracted from the rhombic voltage which is conveyed via the lead 74 only partly through the comparator. If for example a relatively high D.C. voltage occurs on the lead 76, the rhombi are cut off so far that only quite small points are left, as the pulse 77 illustrates. A D.C. voltage which corresponds to an average grey value allows a higher proportional of the rhombic voltages through, as for example pulse 78. Finally, a voltage corresponding to a complete blackening allows the whole rhombic voltage 79 through. The combiner 80 unites the remaining rhombi of opposite phase at the output of the comparator 75 to form rhombic fields of different size. The combiner 80 operates similarly to a transformer, in whose primary side the push-pull offered residual voltages with saw-toothed shaped envelopes are fed and on whose secondary side the A.C. voltages are added to form a single symmetrical voltage with rhombic envelope. The more or less large rhombic shaped pulses occurring on the lead 81 reach the vertical winding of the deflector coil 6 via the adder 45 and the amplifier 46.

When the apparatus starts, the generator is, as mentioned, started for deflecting the first horizontal movement. The above vertical deflection which follows the rhombic pulses thus occurs while the electron beam of the cathode ray tube makes its horizontal movement, thus while it records a raster line. In this way, more or less large rhombic spots are recorded. The size of the rhombi corresponds to the black value of the picture at each point of the line. The horizontal deflection and the frequency of the saw-tooth generator 67 are so dimensioned that the distances of the recorded rhombic surfaces are equal to the distance between rasters which is necessary for recording the picture.

When a line is recorded to its end, a "line end" order comes from the store 28, which order is evaluated in the control device 63 and reaches the horizontal generator 65. The generator is positioned at "0" and can begin with the recording of a new line. The line end pulse also reaches the counter 82 which influences the vertical deflection of the cathode ray tube via the lead 83, the adder 45 and the amplifier 46 and adds a deflector unit. The counter 82 contains a voltage divider whose stage corresponds to the distance of deflection of a raster line in vertical direction. The next line to be recorded is thus shifted by a line step.

This procedure is repeated with every new line until an order is issued by the store, which order initiates the advance of the film material by a certain distance. The film transporting order passes over the lead 84 to the transport of the phototype setter. At the same time, a pulse arrives at the counter 82 and positions it at the original position "0." Line orders which occur further also reach the horizontal deflector generator 65 and the counter 82 via the lead 64, which counter begins to count again from its original position. The film advance which meanwhile occurred must be as large as the sum of the raster line advances which the electron beam, controlled by the counter 82, has made. Further lines are connected without gaps to the preceding lines.

A variation of this last embodiment may be made. In the example just described, it was assumed that the information of the raster spot size, just as in the earlier examples, is coded in stages quantized according to determined functions and is delivered to the raster dot generator. The solution according to a third method does not require this. Since the horizontal deflection is effected progressively, it is possible to feed the variable D.C. voltage obtained during picture scanning directly to the comparator. The advantage of such a construction is that the number of the covering stages of the rasters is no longer limited. However, the raster rhythm remains the same due to the frequency of the generator 67. The size of the remaining rhombi is determined by the size of the control voltage existing on the lead 76; it can therefore take any values. If, during the subtraction of rhombic voltage and control voltage in the comparator, the control voltage changes relatively considerably, the base of the remaining triangles of the rhombi may even be oblique.

The immediate control of the raster generator with D.C. voltage, is however, only suitable if the composing of the half-tone picture is effected in the Life-process. The storing of the information for picture composing is in this case therefore difficult because digital and analogue information would have to be stored in parallel since the operational orders cannot be stored in analogue fashion.

Regarding the shape of the raster spots, the expression "rhombic" also includes a diamond shape standing on one corner. Due to the shaping of the A.C. voltage delivered by the generator 67, further shapes of the raster field can be achieved, e.g. those which approximate a trapezoid or a rectangle or whose contours are curved.

Although minor modifications might be suggested by those versed in the art, it should be understood that we wish to embody within the scope of the patent warranted hereon all such modifications as reasonably and properly come within the scope of our contribution to the art.

What is claimed is:

1. The method of composing rastered continuous pictures by means of electronic phototype setters operating by rastering comprising:

forming characters to be stored;

electro-optically scanning said characters and converting said scanned data into a binary code in which the tonal range from white to black is divided into a finite number of grey stages which are increasingly shaded according to a predetermined non-linear function corresponding to the perception of the human eye and the stages are numbered and binary coded and to each code number there is allocated a raster field whose surface is covered with black corresponding to the tonal value;

storing said data in a memory with predetermined address; and controlling said phototype setter with data from said memory under the control of a suitable program.

2. The method according to claim 1 wherein said characters are formed by manually drawing them on a suitable background.

3. The method according to claim 1 wherein said characters are formed photographically.

4. A method for composing rastered continuous tone pictures by means of electronic phototype setters operating by rastering, wherein the tonal range from white to black is divided into a finite number of grey stages which are increasingly shaded according to a predetermined non-linear function, the stages are numbered and binary coded and to each code number there is allocated a raster field whose surface is covered with black corresponding to the tonal value, and these raster fields are stored as manually constructed character pictures in electronic form in the memory storage of a composing apparatus, the continuous tone picture original to be composed is photoelectrically scanned dot by dot, in successive lines at distances which are the same as the distances between raster fields, the tonal value encountered is quantized and the raster number allocated thereto is determined, and the corresponding raster information is read out from the memory of the phototype setter for recording the raster dot on the picture screen of a cathode ray tube, wherein, in order to obtain the different tonal values the black covering of the raster field is dimensioned according to a function which corresponds to the power of perception of the human eye.

5. The method of claim 4, wherein the blackened part surface of the raster field determining the tonal value forms a spot composed by minimum units, the shape of said spot is approximately a square whose sides run parallel and vertically to the horizontal.

6. The method of claim 4, wherein the blackened part surface of the raster field determining the tonal value forms a spot composed by minimum units, the shape of said spot is approximately to a diamond standing on one corner.

7. The method of claim 4, wherein the distance between the center points of adjacent raster fields is the same as their width, and the distances between successive raster lines is the same as the height of the raster fields, so that black surfaces of adjacent raster fields do not overlap.

8. The method of claim 4, wherein the surface of the raster field consists of a plurality of unconnected black spots on a bright background for bright values and of a plurality of bright spots on a black background dark shading values.

9. The method of claim 4, wherein the black covering surface of the raster field consists of whole numbered multiples of minimum surface units and the number of minimum elements is chosen as a function of the perception of the human eye.

10. A method for composing rastered continuous tone pictures by means of electronic phototype setters operating by rastering, wherein the tonal range from white to black is divided into a finite number of grey stages which are increasingly shaded according to a predetermined non-linear function corresponding to the perception of the human eye and the stages are numbered and binary coded and to each code number there is allocated a raster field whose surface is covered with black corresponding to the tonal value, and these raster fields are stored as manually constructed character pictures in electronic form in the memory storage of a composing apparatus, the continuous tone picture original to be composed is photoelectrically scanned dot by dot, in successive lines at distances which are the same as the distances between raster fields, the tonal value encountered is quantized and the raster number allocated thereto is determined, and the corresponding raster information is read out from the memory of the phototype setter for recording the raster dot on the picture screen of a cathode ray tube.

* * * * *